United States Patent [19]

Burns

[11] Patent Number: 5,344,323
[45] Date of Patent: Sep. 6, 1994

[54] TEACHING RECOGNITION OF BODY MOVEMENT ERRORS IN DANCING

[76] Inventor: Les Burns, P.O. Box 9042, Charlotte, N.C. 28299

[21] Appl. No.: 17,854

[22] Filed: Feb. 16, 1993

[51] Int. Cl.$^5$ .................. A63B 69/00; G09B 9/00; G09B 19/00
[52] U.S. Cl. .................. 434/250; 434/247
[58] Field of Search .......... 273/188 R, 186.1, 187 R, 273/187.2, 29 A; 482/8; 434/247, 250, 252

[56] References Cited

U.S. PATENT DOCUMENTS

| | | | |
|---|---|---|---|
| 3,156,211 | 11/1964 | Mallory, Jr. | 273/187.2 |
| 3,470,628 | 10/1969 | Schuhe . | |
| 4,196,524 | 4/1980 | Bechtel | 340/689 X |
| 4,278,854 | 7/1981 | Krause | 340/698 X |
| 4,349,809 | 9/1982 | Tomes | 340/689 X |
| 4,382,793 | 5/1983 | Anderson | 434/112 |
| 4,502,035 | 2/1985 | Obenauf et al. | 340/323 B |
| 4,527,982 | 7/1985 | Salzman et al. | 434/258 |
| 4,536,755 | 8/1985 | Holzgang et al. | 340/573 |
| 4,737,759 | 4/1988 | Stropkay et al. | 340/689 X |
| 4,911,441 | 3/1990 | Brunner | 273/187.2 X |
| 4,938,476 | 7/1990 | Brunell et al. | 272/93 |
| 5,005,835 | 4/1991 | Huffman | 273/187.2 |
| 5,040,790 | 8/1991 | Anthes et al. | 273/446 |
| 5,108,104 | 4/1992 | Johnson | 273/187.2 |
| 5,199,712 | 4/1993 | Hoyle, Jr. et al. | 273/187.2 |

*Primary Examiner*—Gene Mancene
*Assistant Examiner*—Cindy A. Cherichetti
*Attorney, Agent, or Firm*—Shefte, Pinckney & Sawyer

[57] ABSTRACT

A teaching device for indicating in real time the movement of a selected part of a person's body beyond a desired boundary limit is provided, as well as a method for teaching a person to control his or her body movement in response to alarms provided by the teaching device. The teaching device includes an element for detecting movement of the selected body part beyond a boundary limit, a first alarm element for providing a first alarm indicating encroachment of a nominal misalignment zone in which the body part is nominally out of alignment with a preferred location thereof, and a second alarm element for providing a second alarm in response to encroachment by the selected body part of a significant misalignment zone in which the selected body part is significantly out of alignment with the preferred location thereof. The first alarm provided by a first alarm element is an intermittent beeping tone and a blinking light. The second alarm provided by the second alarm element is a continuous audible tone and continuous illumination of a warning light. A person wears the teaching device on, for example, an arm or a leg and adjusts the alarm limits. Thereafter, as the person executes a series of body movements, the first or second alarm will be provided if the arm or leg to which the teaching device is attached moves beyond the acceptable boundary limits of the proper position of the arm or leg during the series of body movements.

14 Claims, 6 Drawing Sheets

TEACHING RECOGNITION OF BODY MOVEMENT ERRORS IN DANCING

BACKGROUND OF THE INVENTION

The present invention relates to a device for indicating in real time the body movement execution errors of a person during dancing or other coordinated body movement activities.

During the execution of a sequence of body movements in a dance routine or during another activity routine involving coordinated body movement, a person must simultaneously coordinate the proper movement and position of his or her body. To assist in such coordination, a dance instruction device is disclosed in U.S. Pat. No. 3,470,628 to Schuhe for providing foot position indicia of a particular dance routine, and oral instructions as well, to a person learning a dance routine. While instructional media such as the above-noted Schuhe dance instruction device provide information to the dancer regarding proper positions of selected body parts such as the feet or arms, the dancer must monitor body movement to ensure that the rest of his or her body is properly "framed" or positioned in addition to the selected body part whose position is indicated by the instruction media. For example, if the instructional media indicates the proper placement of the feet at the conclusion of a particular sequence of body movements during a dance routine, the dancer can verify the actual position of his or her feet against the desired foot position shown on the instructional media. However, the dancer must also ensure that the other parts of his or her body such as, for example, the upper torso and arms, are also properly "framed" at the end of the sequence of body movements—i.e., the dancer must ensure that all of the other body parts in addition to the feet are in their proper positions as well at the conclusion of the sequence of body movements. As can be imagined, dance routines of any significant complexity present substantial body coordination challenges to novice dancers. Thus, even those who have mastered advance levels of dance movement can still benefit from a teaching method and device which provides instantaneous feedback concerning body movement beyond prescribed limits.

SUMMARY OF THE INVENTION

According to one aspect of the present invention, there is provided a teaching device for indicating in real time the movement of a selected part of a person's body beyond a desired boundary limit during the execution of a sequence of body movements. The device includes means for detecting movement of the selected body part beyond a desired boundary limit and first and second alarm means. The detecting means includes means for emitting a signal and means for selectively energizing the signal emitting means to emit a signal. The selectively energizing means is changeable from a non-initiating condition in which it does not energize the signal emitting means to emit a signal to an initiating condition in which it energizes the signal emitting means to emit a signal in response to movement of the device beyond a selected angle as measured between a reference axis of the device and an alignment plane in which the device normally is moved during execution of the sequence of body movements.

The first alarm means is operatively connected to the signal emitting means, for providing a first alarm in response to receipt of a first signal from the signal emitting means indicating encroachment by the selected body part of a nominal misalignment zone in which the reference axis of the device forms an angle with the alignment plane greater than a predetermined nominal angle and less than a predetermined significant angle. The second alarm means is operatively connected to the signal emitting means for providing a second alarm in response to receipt of a second signal from the signal emitting means indicating encroachment by the selected body part of a significant misalignment zone in which the reference axis of the device forms an angle with the alignment plane at least equal to the predetermined significant angle.

Preferably, the selectively energizing means includes a first actuating assembly, operatively connected to the signal emitting means, for energizing the signal emitting means to emit the first signal and a second actuating assembly, operatively connected to the signal emitting means, to emit the second signal and the means for providing a first alarm includes means for providing the first alarm in response to the receipt of the first signal from the first actuating assembly and the means for providing a second alarm includes means for providing the second alarm in response to receipt of the second signal from the second actuating assembly.

According to further details of the one aspect of the present invention, the first actuating assembly includes a pair of spaced contacts, each operatively connected to the means for providing a first alarm and means for electrically bridging the pair of spaced contacts in response to movement of the device beyond the predetermined nominal angle.

According to additional details of the one aspect of the present invention, the means for selectively bridging the pair of spaced contacts includes an amount of an electrically conductive fluid portion and a container for containing the electrically conductive fluid portion, the container being configured to guide the electrically conducive fluid portion between a location in the container in which the electrically conducive fluid portion is out of contact with the pair of spaced contacts in the non-initiating condition of the selectively energizing means and a location within the container in which the electrically conducive fluid portion electrically bridges the pair of spaced contacts in the initiating condition of the selectively energizing means. Also, the container housing the first electrically conductive fluid portion and the container housing the second electrically conductive fluid portion are angularly offset from one another as measured in the direction of the reference axis of the device.

According to yet other details of the one aspect of the present invention, the device includes means for adjustably reorienting the first and second containers while maintaining the containers in their fixed angular relationship to one another. Preferably, the means for adjustably reorienting the first and second containers includes means for selectively pivoting the first and second containers about an axis transverse to the reference axis of the device. Additionally, the means for providing a first alarm preferably includes an audible alarm operable to emit a predetermined auditory alarm in response to receipt of the first signal from the signal emitting means and the means for providing a second alarm includes means, operatively connected to the audible alarm means, for controlling the audible alarm to emit a predetermined second auditory alarm different than the first auditory alarm in response to receipt of the second signal from the signal emitting means.

According to a different aspect of the present invention, there is provided a method for teaching control of body movement during the execution of a sequence of dance motions. The method includes the steps of providing a device for detecting movement of a selected body part beyond a desired boundary limit to be worn by a dancer and executing a sequence of dance movements while wearing the device. Also, the method includes controlling body movement in response to a first alarm from the device indicating encroachment by the selected body part of a nominal misalignment zone in which the selected body part is nominally out of alignment with a preferred location thereof and controlling body movement in response to a second alarm by the device indicating encroachment by the selected body part of a significant misalignment zone in which the selected body part is relatively more out of alignment with its preferred location than if the selected body part were in the nominal misalignment zone.

DESCRIPTION OF THE PREFERRED EMBODIMENT

Figure 1:
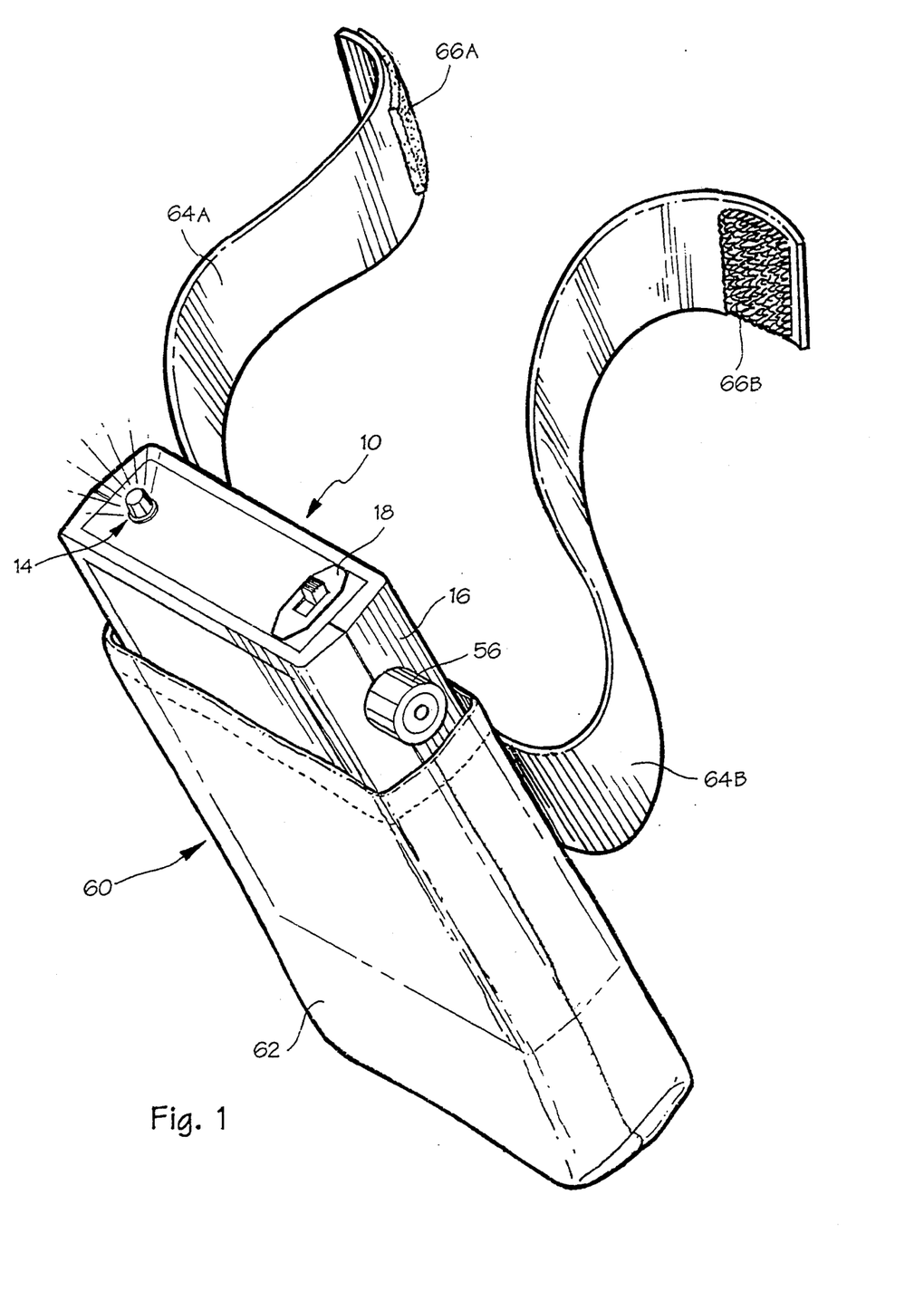
FIG. 1 is perspective view of the preferred embodiment of the teaching device of the present invention and showing a carrying case for releasably mounting the device on a person for use of the device with a teaching session in accordance with the method of the present invention.
Figures 2, 2A:
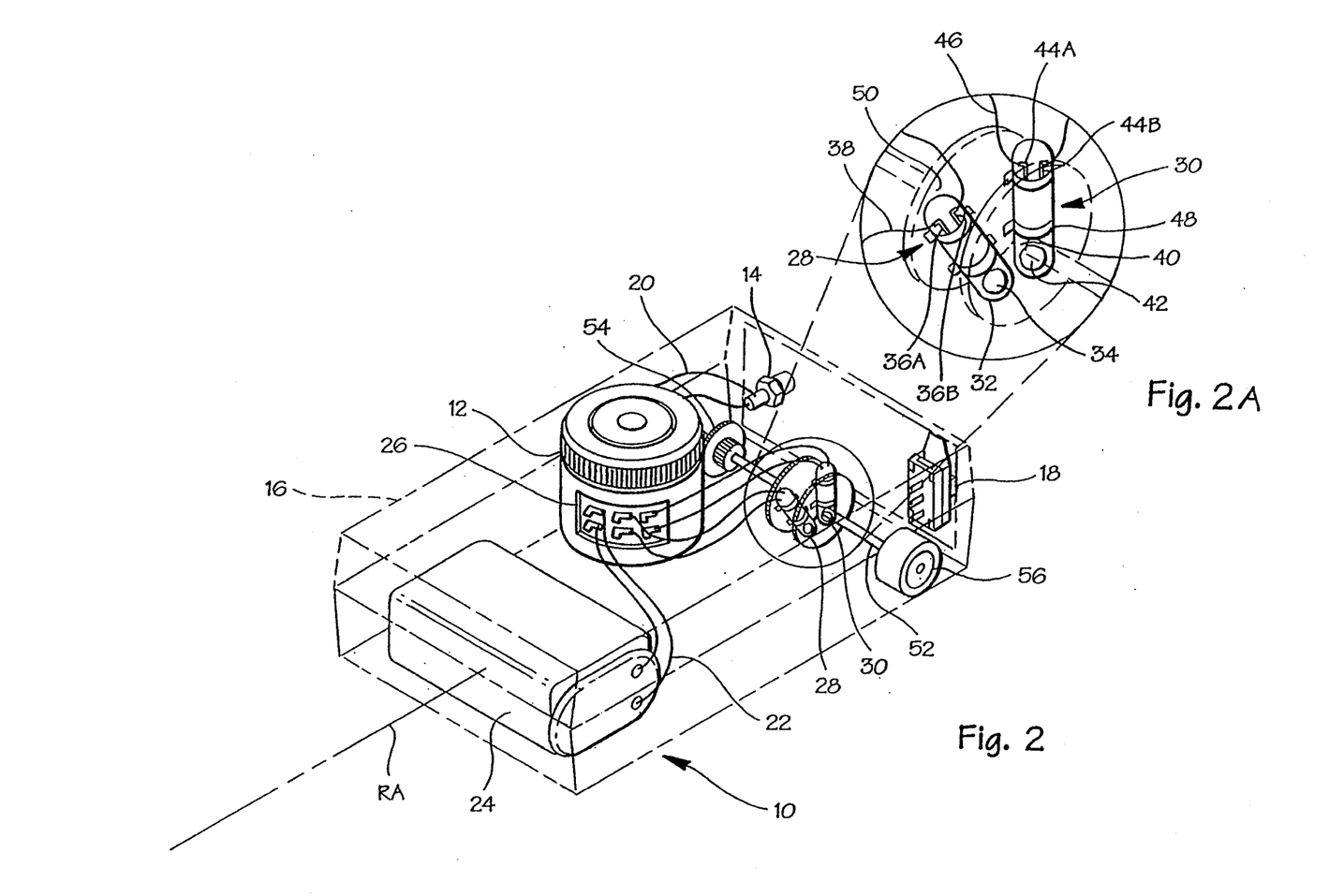
FIG. 2 is a perspective cut-away view of the teaching device shown in FIG. 1 and showing, in enlarged perspective closeup, details of the selectively energizing means of the device.
FIG. 2A is a perspective view of the actuating assembly of the present invention.

In FIGS. 1-2, the preferred embodiment of the teaching device 10 of the present invention is illustrated. The teaching device 10 is worn by a person during a teaching session conducted in accordance with the method of the present invention for indicating in real time the movement of a selected part of the person's body beyond a desired boundary limit during the execution of a sequence of body movements such as, for example, a sequence of dance movements.

The teaching device 10 includes means for detecting movement of the selected body part of the person wearing the device beyond a desired boundary limit, means for providing a first or preliminary warning alarm indicating encroachment of the selected body part of a nominal misalignment zone in which the selected body part is slightly out of alignment with a preferred or correct position and means for providing a second or post-warning alarm indicating encroachment by the selected body part of a significant misalignment zone in which the selected body part is relatively significantly out of alignment with a correct or proper position.

As will be explained hereafter in more detail, the teaching device 10 has particular advantages for a person learning or practicing a sequence of body movements, a pair partners or a team learning or practicing a sequence of body movements, and an instructor teaching coordinated body movement to others. Types of coordinated body movements which may be learned or practiced with the help of the teaching device range from relatively uncomplicated, highly repetitious body movement activities such as, for example, arm lifts to relatively complicated body movements involving simultaneous movement of arms and legs as well as twisting or bending of the torso such as, for example, country and western dancing executed on a competition level. The teaching device 10 also finds use in connection with coordinated body movement in which the person manipulates sport or exercise equipment such as, for example, a baseball bat or golf club. In general, the teaching device 10 provides particular advantages for learning or practicing coordinated body movements of the type in which at least one of the user's limbs is required to move within a predetermined spacial zone or area relative to the some other part of the user's body or in relation to the coordinated body movement of a partner or other team member. Additionally, as will be described with respect to one variation of the preferred embodiment of the teaching device 10, the teaching device can be configured to provide an alarm indicating that the respective body part on which the teaching device is mounted is being moved at an unacceptably high speed.

With reference now to more details of the teaching device 10, as seen in FIG. 2, both the means for providing a first warning alarm and the means for providing a second or post-warning alarm are, for the sake of compactness and operating efficiency, preferably configured as a unitary alarm assembly having two different alarm outputs, one corresponding to the first or warning alarm and the other corresponding to the second or post-warning alarm. In the preferred embodiment, as seen in FIG. 2, the unitary alarm assembly is in the form of a tone generating element 12 and a light broadcasting element 14. The tone generating element 12, which may be any one of a number of commercially available elements of this type, is operable to intermittently generate an audible tone in response to receipt of a first signal from the first signal means and to generate a relatively constant decibel continuous audible tone in response to the receipt of a second signal from the signal emitting means. The tone generating element 12 and the light broadcasting element 14 are commonly housed in a housing 16 which preferably has the characteristic of being relatively impact-and-deformation resistant. The housing 16 may be in the form of any one of a number of commercially available hard plastic clam shell housing having a top clam shell easily removable via bolts or the like from the bottom clam shell to expose the interior of the housing. Enhancements such as an on/off switch 18, as seen in FIGS. 1 and 2, can be found on several such commercially available clam shell housings and, depending upon the desired features of the teaching device 10, may be suitable for use as the housing 16.

The light broadcasting element 14, as seen in FIG. 1, includes a filament bulb covered by a colored lens. The light broadcasting element 14 is operatively connected to the tone generating element 12 via a pair of connectors 20, as seen in FIG. 2.

The colored lens is fixed mounted to the housing 16 and projects outwardly therefrom to surround the filament bulb (not shown) disposed interiorly of the colored lens. The light broadcasting element 14 is normally not eliminated but is operable to broadcast an intermittently blinking light upon receipt of a first signal by the tone generating element 12 or is continuously illuminated in response to the receipt of a second signal by the tone generating element 12.

The tone generating element 12 is connected via a pair of connectors 22 to a suitable energy source 24 which may be, for example, a conventional 9 volt battery or a 1.5 volt "watch"-type battery. The energy source 24 is preferably housed, as well, within the housing 16 for greater compactness of the teaching device, as well as to protect the energy source 24 and the other elements within the housing 16 from damage. The means for emitting a signal includes a circuit assembly 26, as seen in FIG. 22, to which the connectors 22 are connected. The circuit assembly 26 is operatively connected to the tone generating element 12 which provides the first or warning signal and the second or post-warning signal in response to selective energization to the circuit assembly 26 by a first actuating assembly 28 or a second actuating assembly 30, respectively.

As seen in FIG. 2, the first actuating assembly 28 includes a container 32 in the form of an elongate closed glass tube containing an electrically conductive fluid portion 34 and a pair of spaced contacts 36A,36B fixedly mounted at one end of the container 32 and connected via connectors 38 to the circuit assembly 26. The second actuating assembly 30 includes a container 40 in the form of an elongate closed glass tube housing an electrically conductive fluid portion 42 and a pair of spaced contacts 44A,44B fixedly mounted at one end of the container 40 in spaced relation to one another and operatively connected via connectors 46 to the circuit assembly 26.

The container 32 of the first actuating assembly 28 and the container 40 of the second actuating assembly 30 are both mounted via a plurality of rigid straps 48 to a mounting plate 50 of a means for adjusting the warning limits of the teaching device 10. The adjusting means also includes a shaft 52 which extends laterally from both sides of the mounting plate 50 and is fixedly mounted thereto. The shaft 52 is rotatably supported within the housing 16 by a pair of shaft journals 54 (only one is shown in FIG. 2) and an adjustment knob 56 is fixedly mounted to one end of the shaft 50 which extends outwardly of the housing 16 for permitting a user to rotate the containers 32 and 40 about the axis of the shaft 52 to thereby adjust the warning limits of the teaching device 10, as will be explained in more detail below.

The on/off switch 18 is connected via connectors (not shown) to the circuit assembly 26 for selectively interrupting the supply of current from the energy source 24 to the circuit assembly 26.

The circuit assembly 26 selectively electrically connects the "hot" wire of the connectors 22 from the energy source 24 to a respective one wire of each of the pair of connector wires of the connectors 38,46. The other wire of the pair of connector wires of the pair of connector wires 38 extends from the spaced contact 36B to the circuit assembly 26 and is electrically connected to the tone generating element 12. The other of the pair of the wires 46 extends from the spaced contact 44B to the circuit assembly 26 which electrically connects the wire to the tone generating element 12.

The spaced contact 36A is mounted at a permanent spacing from the spaced contact 36B within the container 32. However, when the electrically conductive fluid portion 34 (which may be, for example, a drop of mercury) has moved within the container 32 to be in contact with both of the spaced contacts 36A,36B, electrical current flows from the energy source 24 along the "hot" wire of the connectors 22 and thereafter along both of the pair of the connector wires 38 to the tone generating element 12 to thereby energize the tone generating element to produce an audible alarm. Likewise, the spaced contacts 44A,44B are permanently mounted in the container 40 out of contact with one another but, when the electrically conductive fluid portion 42, electrical current flows from the "hot" wire of the connectors 22 to the one respective connector wire 46 via the circuit assembly 26 and, thereafter, through the other respective connector wire 46 to the tone generating element 12 to provide voltage thereto.

The tone generating element 12 is configured to generate an intermittent audible "beep" tone in response to the receipt of a predetermined first level of voltage which corresponds to the voltage received by the tone generating element 12 when the electrically charged fluid portion 34 of the first actuating assembly 28 has electrically connected the spaced contacts 36A,36B to complete a circuit to the tone generating element and the electrically conductive fluid portion 42 of the second actuating assembly 30 is not electrically connecting the space contacts 44A,44B. The tone generating element 12 is also configured to generate an audible tone different than the intermittent "beeping" tone—preferably, a continuous audible tone—in response to the receipt of a second level of voltage corresponding to the cumulative voltage supplied from the energy source 24 through both the first actuating assembly 28 and the second actuating assembly 30. Both the first actuating assembly 28 and the second actuating assembly 30 will electrically connect the tone generating element 12 with the energy source 24 when their respective electrically conductive fluid portions 34,42 electrically bridge or connects the respective pairs of spaced contacts 36A,36B or 44A,44B. The tone generating element supplies an electrical current to the light broadcasting element 14 having a voltage proportional to the voltage received by the tone generating element 12 and the filament bulb of the light broadcasting element 14 is intermittently illuminated in a "blinking" manner in response to the receipt by the tone generating element 12 of voltage supplied only through the first actuating assembly 28 and is continuously illuminated in response to receipt by the tone generating element 12 of voltage supplied through both the first actuating assembly 28 and the second actuating assembly 30.

Figures 3A, 3B, 3C, 3D:
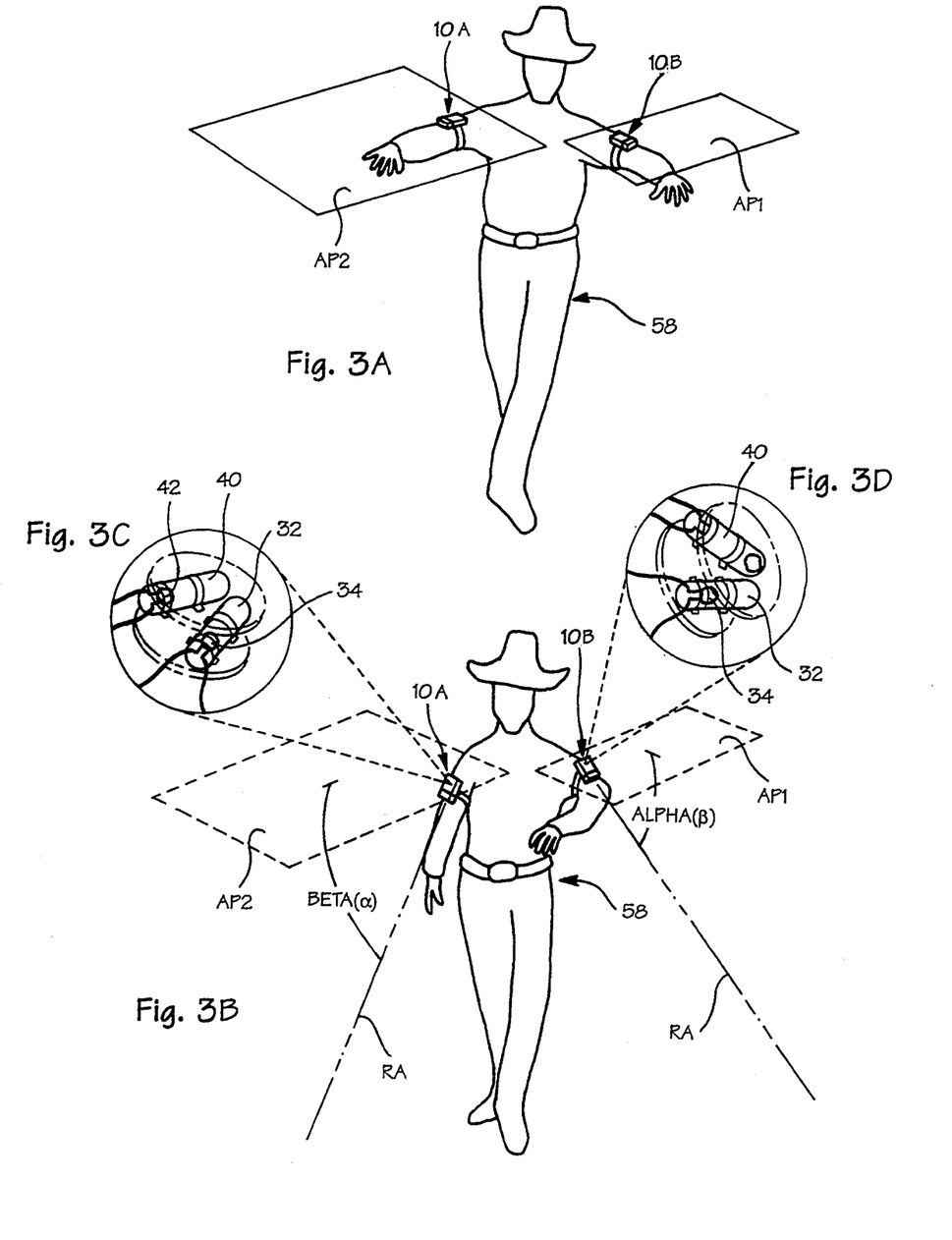
FIG. 3A is a front schematic elevational view of a person having one of the teaching devices of the present invention secured to each arm for a teaching session therewith and showing the person's arms disposed in correct alignment at a prescribed instant during a sequence of dance movements.
FIG. 3B is a front schematic elevational view of the person shown in FIG. 3A and showing one of the person's arm in a nominal misalignment zone relatively slightly out of alignment with the correct position thereof and showing the person's other arm in a significant misalignment zone significantly out of alignment with the correct position thereof at another prescribed instant during a sequence of dance movements.
FIG. 3C is a perspective view of the actuating assembly of the present invention indicating that the person's arm is in significant misalignment.
FIG. 3D is a perspective view of the actuating assembly of the present invention indicating that the person's arm is in nominal misalignment.

With reference now to FIGS. 3A and 3B, the alarm functioning of the teaching device 10 will now be explained. A person 58 has a unit 10A of the teaching device 10 secured to his right arm and a unit 10B of the teaching device secured to his left arm. As seen in FIG. 1, each teaching device unit 10A,10B can be conveniently mounted the arm of the person 58 by a soft cloth holster arrangement 60 which includes a pouch portion 62 dimensioned for slight receipt of the housing 16 therein and a pair of strap portions 64A,64B. The strap portion 64A has hook fasteners 66A of a conventional hook-and-loop type fastening assembly and the strap portion 64B has the loop fasteners of the hook-and-loop fastener assembly. The loop fastener 66A of the strap portion 64A are secured to the hook fastener 66B of the strap portion 64B to secure the holster assembly 60 in encircling relation about the user's limb such as, for example, the upper portion of an arm. The holster assembly 60 is oriented such that the end of the housing 16 on which the colored lens is mounted is the uppermost end.

For purposes of illustrating an exemplary sequence of body movements, the person 58 shown in FIG. 3A is shown in the proper body carriage "frame" of a dancer at a prescribed instant during the execution of a "country and western" dance type routine. In addition to having other parts of his body in proper "frame", the person 58 has his right and left arms substantially horizontally outstretched in a correct position thereof. At this prescribed instant of the sequence of dance movements, which are executed in a dynamic, non-interrupted manner during a practice session in which the teaching device units 10A,10B are worn or during an actual performance of the dance routine, the outstretched arms are considered to be properly "aligned" if they are substantially horizontally outstretched. In this correct alignment position of the arms, each teaching device unit 10A,10B is in a respective alignment plane AP1 and AP2 in which a respective arbitrarily designated reference axis RF1 and RF2 of the teaching device unit defines the alignment plane. As seen in FIG. 2, the reference axis of each teaching device unit 10A,10B may be selected as a longitudinal axis passing through the center of the housing 16 as measured along a longitudinal extent thereof.

So long as the person 58 moves his outstretched arms in substantial horizontal movements which deviate at the most only slightly from the alignment plates AP1,AP2, the teaching device units 10A,10B do not emit an audible alarm or a visual alarm. So long as each arm moves in such a manner that the respective teaching device unit 10A,10B remains substantially within its alignment plane AP1,AP2, the electrically conductive fluid portion 32 of the first actuating assembly 28 and the electrically conducting fluid portion 42 of the second actuating assembly 30 remain out of electrically bridging contact with the respective pair of spaced contacts 36A,36B or 44A,44B and, accordingly, the tone generating element 12 draws no voltage from the energy source 24.

However, as seen in FIG. 3B, each teaching device unit 10A,10B provides a first or warning alarm upon encroachment of the respective arm of the person into a nominal misalignment zone in which the arm is relatively nominally out of alignment with the alignment plane AP1 or AP2 or a second or post-warning alarm in the event that the arm of the person is relatively significantly out of alignment with the alignment plane. The teaching device unit 10A shown in FIG. 3B is emitting a first or warning alarm to indicate that the left arm of the person 58 has encroached a nominal misalignment zone in which the reference axis RA1 of the teaching unit device 10A forms an angle alpha ($\alpha$) greater than a predetermined nominal angle and less than a predetermined significant angle beta ($\beta$). During this encroachment of the nominal misalignment zone, the electrically conductive fluid portion 32 of the first actuating assembly 28 travels into electrically connecting or bridging contact with the pair of spaced contacts 36A,36B to thereby electrically interconnect the tone generating element 12 with the energy source 24 to receive a first level of voltage while the electrically conductive fluid portion 42 of the second actuating assembly 30 remains out of bridging contact with the pair of contacts 44A,44B.

During encroachment of the nominal misalignment zone, the electrically conductive fluid portion 34 moves along the container 32 due to the orientation of the container relative to the reference axis RA1. As seen in the enlarged perspective view I of the container 32 of the teaching device unit 10A shown in FIG. 3b, the container 32 forms an acute angle relative to the reference axis RA1 (and, thus, the alignment plane AP1) which is less acute than the angle formed between the reference axis RA1 and the container 40 of the second actuating assembly 30. Accordingly, as the teaching device unit 10A is progressively lowered until its reference axis RA1 forms the angle $\alpha$ with the alignment plane AP1, the electrically conductive fluid portion 34 of the first actuating assembly 28 moves under the action of gravity sufficiently along the container to electrically bridge the space contacts 36A,36B.

In the event that the respective body part of the person has significantly deviated from the respective alignment plane of the teaching device unit, the teaching device unit emits a second or post-warning alarm which, as described above, is comprised of a continuous beep emitted by the tone generating element 12 and continuous illumination of the filament bulb of the light broadcasting element 14. For example, as seen in FIG. 3B, the right arm of the person 58 has fallen to a near vertical position in which the reference axis RA2 of the teaching device unit 10B forms a significant angle beta ($\beta$) relative to the alignment plane AP2. The angle beta ($\beta$) is greater than the angle $\alpha$. As seen in the enlarged perspective view II of the containers 32,40, the respective electrically conductive fluid portion 34,42 is each container has traveled along the extent of the container into contact with the respective pair of spaced contacts 36A,36B or 44A,44B so that the tone generating element 12 is now supplied with voltage to both the first actuating assembly 28 and the second actuating assembly 30. As a result of the near vertical position of the right arm of the person 58, the electrically conductive fluid portions of both containers 32,40 of the teaching unit device 10B are moved under the force of gravity into their electrically bridging contact, whereas, in contrast, only the electrically conductive fluid portion 34 in the container 32 of the teaching device unit 10A shown in FIG. 3B (see enlarged perspective view I of that Figure) has moved sufficiently along its container to electrically bridge the respective pair of spaced contacts.

Each respective pair of the FIGS. 4A-B, 5A-B, and 6A-B illustrate a possible scenario involving a pair of dancer partners 68,70 executing a predetermined sequence of "country and western" type dance movements with one or more of the partners wearing at least one of the teaching devices 10 of the present invention for providing instructional feedback to the dancers.

Figure 4A:
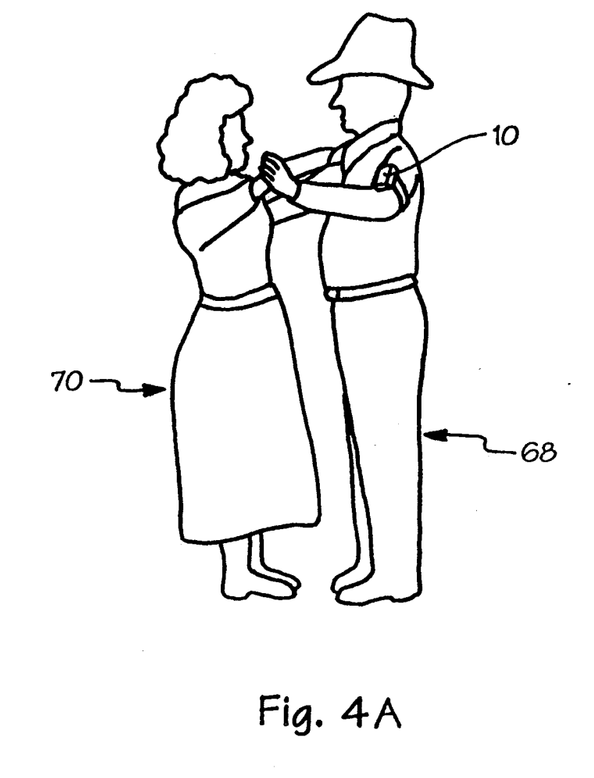
FIG. 4A is a front schematic elevational view of a pair of dance partners, one of whom has the teaching device of the present invention mounted on an arm and showing the arms of the dance partners in their correct positions during a prescribed instant of a sequence of dance movements.

FIG. 4A illustrates a prescribed instant during a sequence of dance movements being executed by a pair of dance partners 68,70. The dancer partner 68 is wearing one unit of the teaching device 10 on each of his upper arms and, at the prescribed instant illustrated in FIG. 4A, the dance partner 68 is properly "framed" or positioned. In other words, the arms of the dance partner 68, as well as the rest of his body, are in their correct aligned positions.

Figure 4B:
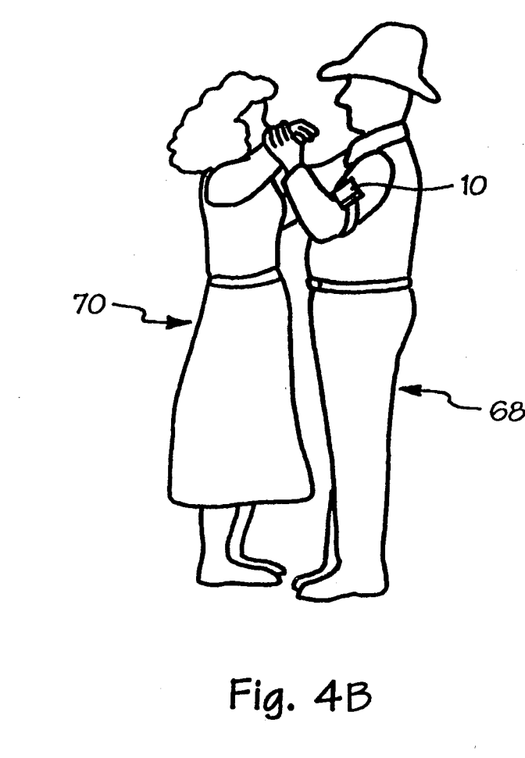
FIG. 4B is a front schematic elevational view of the pair of dance partners shown in FIG. 4A and showing the respective partner's arm mounting the teaching device in a nominal misalignment zone in which the teaching device emits a first or warning alarm.

FIG. 4B illustrates the dance partners 68,70 at another prescribed instant during their sequence of dance movements in which, unlike the situation illustrated in FIG. 4A, the left arm of the dance partner 68 has moved beyond a boundary limit into a nominal misalignment zone or a significant misalignment zone. In particular, the left arm of the dance partner 68 has dropped from the proper elevated position thereof illustrated in FIG. 4A to a dropped position in which the elbow of the left arm is closer to the dancer partner's torso. In this situation, the unit of the teaching device 10 mounted on the dance partner's left arm will provide either an intermittent "beeping" audible tone (from the tone generating element 12) and intermittent "blinking" light (from the light broadcasting element 14), in the event that the left arm has moved into a nominal misalignment zone, or a continuous audible tone (from the tone generating element 12) and continuous light illumination (from the light broadcasting element 14) in the event that the left arm has encroached a significant misalignment zone.

Figure 5A:
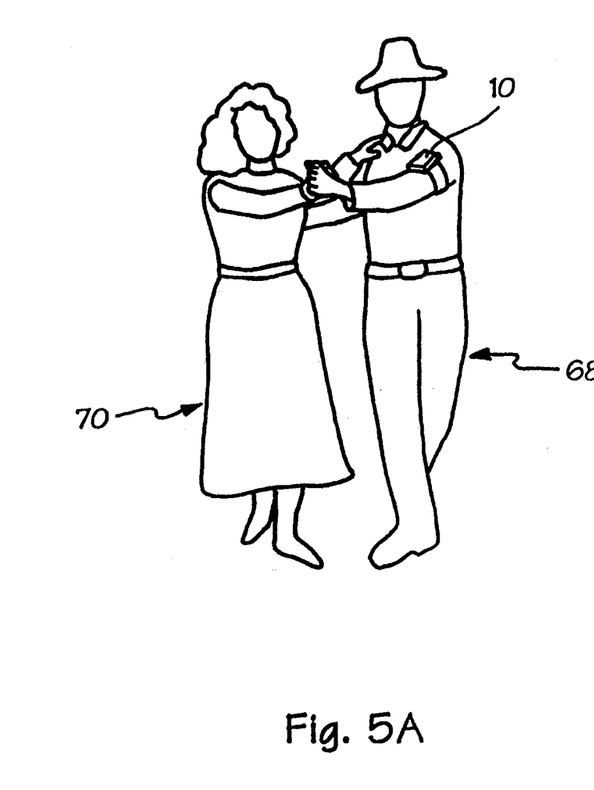
FIG. 5A is a front schematic elevational view of a pair of dance partners each having a teaching device of the present invention mounted on one arm and showing the arms of the dance partners in their proper positions during a prescribed instant of a sequence of dance movements.
Figure 6A:
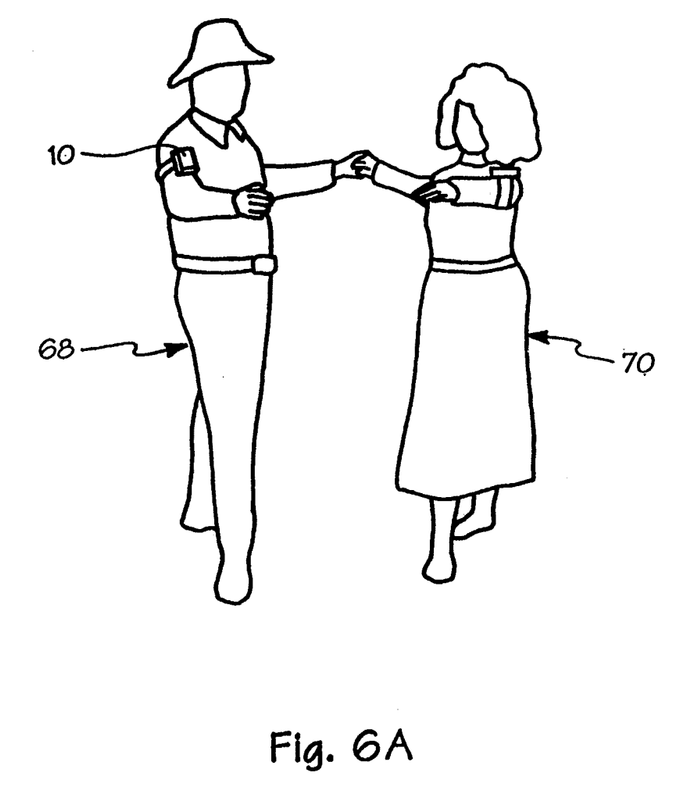
FIG. 6A is a front schematic elevational view of a pair of dance partners, one of whom has a teaching device of the present invention on each arm and the other of whom has the teaching device of the present invention on one arm.

FIGS. 5A and 6A each illustrate a respective prescribed instant during a sequence of "country and western"-dance movements being executed by the pair of dance partners 68,70. In FIG. 5A, the dance partner 68 is wearing one unit of the teaching device 10 on his upper left arm and the dance partner 70 is wearing one unit of the teaching device 10 on her upper right arm. In FIG. 6A, the dance partner 68 is wearing a unit of the teaching device 10 on each of his upper arms (only the unit of the teaching device 10 on the right arm is illustrated). In the respective prescribed instances of the "country and western"-type dance sequences illustrated in FIGS. 5A and 6A, both of the dance partners 68,70 have their arms in the correct aligned positions and accordingly, none of the units of the teaching device 10 being worn by the dance partners emits a warning or a post-warning alarm.

Figure 5B:
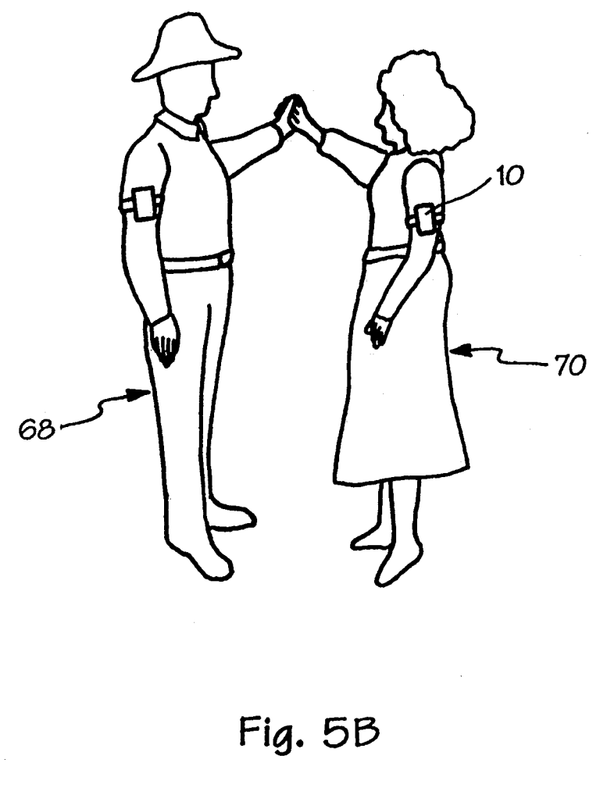
FIG. 5B is a front schematic elevational view of the pair of dance partners shown in FIG. 5A and showing the respective arms of the dance partners on which the teaching devices are carried each in a respective misalignment zone in which the respective teaching device emits a second or post-warning alarm.
Figure 6B:
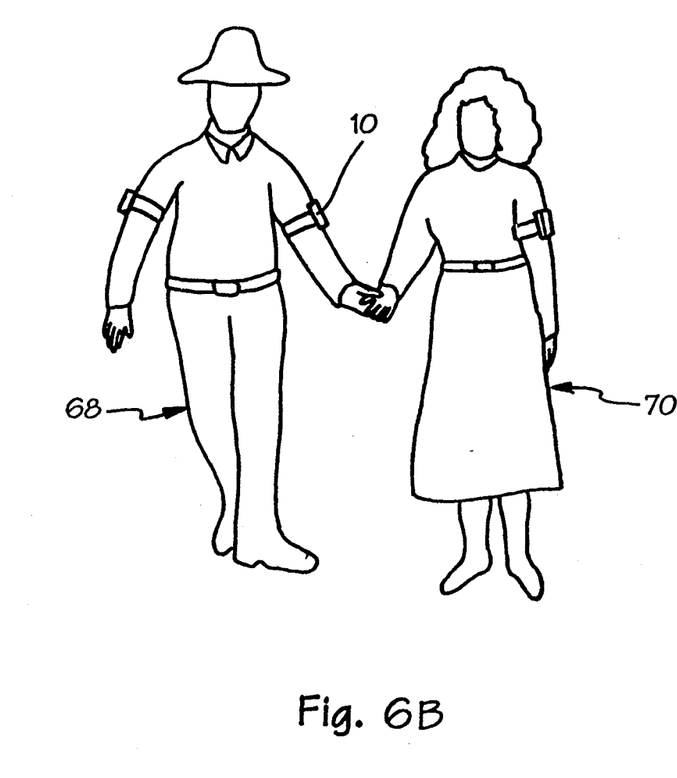
FIG. 6B is a front schematic elevational view of the pair of dance partners shown in FIG. 6A at a prescribed instant in a sequence of dance movements with the pair of teaching devices on the one partner's arms emitting post-warning alarms indicating encroachment of the arms into significant misalignment zones.

On the other hand, in the situations illustrated in FIGS. 5B and 6B, the right arm of the dance partner 68 and the left arm of the dance partner 70 are each out of their respective aligned positions and the respective unit of the teaching device 10 secured to each arm emits a post-warning alarm comprising a continuous audible tone and continuous illumination of the light generating element 14.

It will therefore be readily understood by those persons skilled in the art that the present invention is susceptible of broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A teaching device for indicating in real time the movement of a selected part of a person's body beyond a desired boundary limit during the execution of a sequence of body movements, the device comprising:

means for detecting movement of the selected body part beyond a desired boundary limit, the detecting means including means for emitting first and second signals and means for selectively energizing the signal emitting means to emit said first and second signals, the selectively energizing means being changeable from a non-initiating condition in which it does not energize the signal emitting means to emit said first and second signals to an initiating condition in which it energizes the signal emitting means to emit said first and second signals in response, respectively, to different degrees of movement of the device beyond a selected angle as measured between a reference axis of the device and an alignment plane in which the device normally is moved during execution of the sequence of body movements;

means, operatively connected to the signal emitting means, for providing a first alarm in response to receipt of a first signal from the signal emitting means indicating encroachment by the selected body part of a nominal misalignment zone in which the reference axis of the device forms an angle with the alignment plane greater than a predetermined nominal angle and less than a predetermined significant angle ,said predetermined significant angle being greater than said predetermined nominal angle; and means, operatively connected to the signal emitting means, for providing a second alarm in response to receipt of a second signal from the signal emitting means indicating encroachment by the selected body part of a significant misalignment zone in which the reference axis of the device forms an angle with the alignment plane at least equal to the predetermined significant angle, said second alarm being distinguishable from said first alarm.

2. A device according to claim 1 wherein the selectively energizing means includes a first actuating assembly, operatively connected to the signal emitting means, for energizing the signal emitting means to emit the first signal and a second actuating assembly, operatively connected to the signal emitting means, to emit the second signal and the means for providing a first alarm includes means for providing the first alarm in response to the receipt of the first signal from the first actuating assembly and the means for providing a second alarm includes means for providing the second alarm in response to receipt of the second signal from the second actuating assembly.

3. A device according to claim 2 wherein the first actuating assembly includes a pair of spaced contacts, each operatively connected to the means for providing a first alarm and means for electrically bridging the pair of spaced contacts in response to movement of the device beyond the predetermined nominal angle.

4. A device according to claim 3 wherein the means for selectively bridging the pair of spaced contacts includes an amount of an electrically conductive fluid portion and a container for containing the electrically conductive fluid portion, the container being configured to guide the electrically conducive fluid portion between a location in the container in which the electrically conductive fluid portion is out of contact with the pair of spaced contacts in the non-initiating condition of the selectively energizing means and a location within the container in which the electrically conducive fluid portion electrically bridges the pair of spaced contacts in the initiating condition of the selectively energizing means.

5. A device according to claim 3 wherein the means for providing a first alarm includes an audible alarm.

6. A device according 3 wherein the means for providing a first alarm includes a visual alarm.

7. A device according to claim 2 wherein the second actuating assembly includes a pair of spaced contacts, each operatively connected to the means for providing a first alarm and means for electrically bridging the pair of spaced contacts in response to movement of the movement of the device beyond the predetermined nominal angle.

8. A device according to claim 7 wherein the means for selectively bridging the pair of spaced contacts includes an amount of an electrically conductive fluid portion and a container for containing the electrically conductive fluid portion, the container being configured to guide the electrically conducive fluid portion between a location in the container in which the electrically conductive fluid portion is out of contact with the pair of spaced contacts in the non-initiating condition of the selectively energizing means and a location within the container in which the electrically conductive fluid portion electrically bridges the pair of spaced contacts in the initiating condition of the selectively energizing means.

9. A device according to claim 8 wherein the container housing the first electrically conductive fluid portion and the container housing the second electrically conductive fluid portion are angularly offset from one another as measured in the direction of the reference axis of the device.

10. A device according to claim 9 and further comprising means for adjustably re-orienting the first and second containers while maintaining the containers in their fixed angular relationship to one another.

11. A device according to claim 10 wherein the means for adjustably reorienting the first and second containers includes means for selectively pivoting the first and second containers about an axis transverse to the reference axis of the device.

12. A device according to claim 11 wherein the means for providing a first alarm includes an audible alarm operable to emit a predetermined auditory alarm in response to receipt of the first signal from the signal emitting means and the means for providing a second alarm includes means, operatively connected to the audible alarm means, for controlling the audible alarm to emit a predetermined second auditory alarm different than the first auditory alarm in response to receipt of the second signal from the signal emitting means.

13. A method for teaching control of body movement during the execution of a sequence of dance motions comprising:

providing a device for detecting movement of a selected body part beyond a desired boundary limit to be worn by a dancer;

executing a sequence of dance movements while wearing the device;

controlling body movement in response to a first alarm from the device indicating encroachment by the selected body part of a nominal misalignment zone in which the selected body part is nominally out of alignment with a preferred location thereof; and controlling body movement in response to a second alarm by the device indicating encroachment by the selected body part of a significant misalignment zone in which the selected body part is relatively more out of alignment with its preferred location than if the selected body part were in the nominal misalignment zone.

14. A method for teaching control of body movement during the execution of a sequence of dance motions comprising:

providing a device for detecting movement of a selected body part beyond a desired boundary limit to be worn by a dancer;

executing a sequence of dance movements while wearing the device;

controlling body movement during said execution of said sequence of dance movements in response to first alarm from the device indicating encroachment by the selected body part of a nominal misalignment zone in which the selected body part is nominally out of alignment with a preferred location thereof so as to correct the misalignment of said selected body part.

* * * * *